United States Patent [19]

Faraoni et al.

[11] Patent Number: 5,781,988
[45] Date of Patent: Jul. 21, 1998

[54] DYNAMO-ELECTRIC MACHINE COMPONENT CONVEYING SYSTEMS AND LOAD/UNLOAD DEVICES

[75] Inventors: Alessandro Faraoni; Massimo Lombardi, both of Florence; Maurizio Mugelli, Siena, all of Italy

[73] Assignee: Axis USA, Inc., Marlborough, Mass.

[21] Appl. No.: 804,674

[22] Filed: Feb. 25, 1997

Related U.S. Application Data

[62] Division of Ser. No. 305,685, Sep. 13, 1994, Pat. No. 5,635,014.

[51] Int. Cl.[6] .............................. H02K 15/00; B65G 47/52
[52] U.S. Cl. .............................. 29/735; 29/596; 29/736; 29/784; 198/346.1; 198/346.2; 242/433
[58] Field of Search ....................... 29/596, 732–736, 29/784, 786, 794; 198/346.1, 346.2, 468.4; 242/433, 433.3, 433.4; 414/736; 219/56.1

[56] References Cited

U.S. PATENT DOCUMENTS

| Re. 31,945 | 7/1985 | Magni | 198/341 |
|---|---|---|---|
| 4,006,862 | 2/1977 | Shively et al. | 242/7.05 B |
| 4,012,834 | 3/1977 | LeVasseur | 29/736 X |
| 4,087,054 | 5/1978 | Finegold | 242/7.05 B |
| 4,718,533 | 1/1988 | Nussbaumer et al. | 198/346.1 |
| 5,062,190 | 11/1991 | Kitamura | 29/33 |
| 5,145,052 | 9/1992 | Santandrea et al. | 198/468.2 |
| 5,253,912 | 10/1993 | Andorlini et al. | 294/119.1 |
| 5,257,689 | 11/1993 | Lombardi et al. | 198/468.2 |
| 5,370,212 | 12/1994 | Mizutani et al. | 198/346.1 |
| 5,372,319 | 12/1994 | Dolgas | 242/7.05 B |
| 5,653,014 | 8/1997 | Faraoni et al. | 29/732 |

FOREIGN PATENT DOCUMENTS

| 63-295135 | 12/1988 | Japan | B23P 21/00 |
|---|---|---|---|
| 1240235 | 9/1989 | Japan | 29/732 |
| 1-306139 | 12/1989 | Japan | B23P 19/04 |
| 5-77116 | 3/1993 | Japan | B23P 19/00 |

*Primary Examiner*—Peter Vo
*Attorney, Agent, or Firm*—Fish & Neave; Robert R. Jackson; G. Victor Treyz

[57] ABSTRACT

An improved conveying system in a parallel processing production line for dynamo-electric machine components having a magnetic core, the conveying system having a main conveyor extending along all of the processing machines of the production line and a load/unload device for transferring components between the main conveyor and a selected processing machine. Components to be processed are loaded directly from the main conveyor onto the load/unload device without the use of an intermediate conveyor. The load/unload device has a base platform with an alignment area at which transfer between the load/unload device and either the main conveyor or a selected processing machine occurs. Two component holders (e.g., collets) are movably mounted on the base platform for alternate positioning at the alignment area. The load/unload device alternately positions the gripping ends of the component holders adjacent the main conveyor and a selected processing machine. The central axis of the load/unload device remains fixed during movement of the load/unload device.

7 Claims, 7 Drawing Sheets

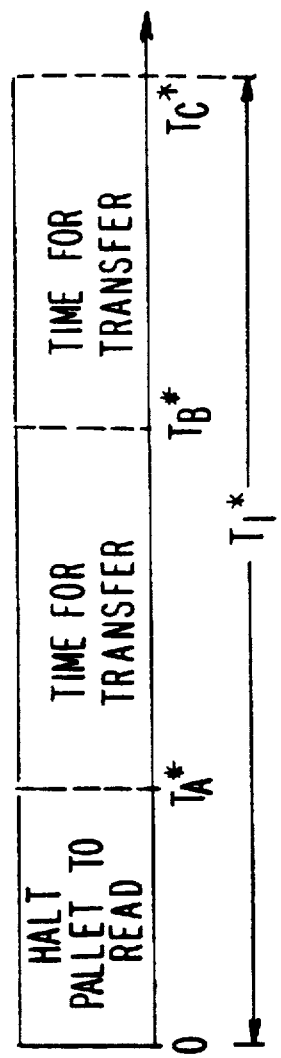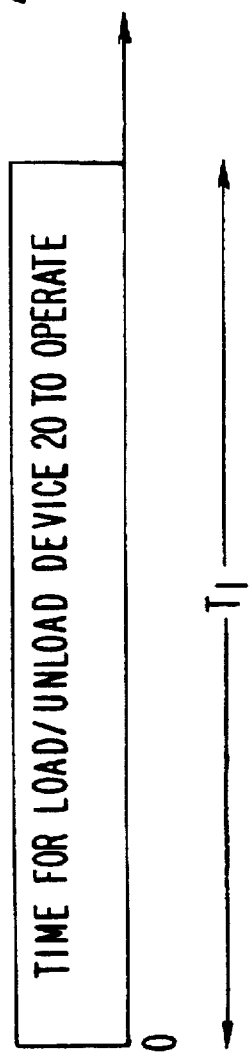

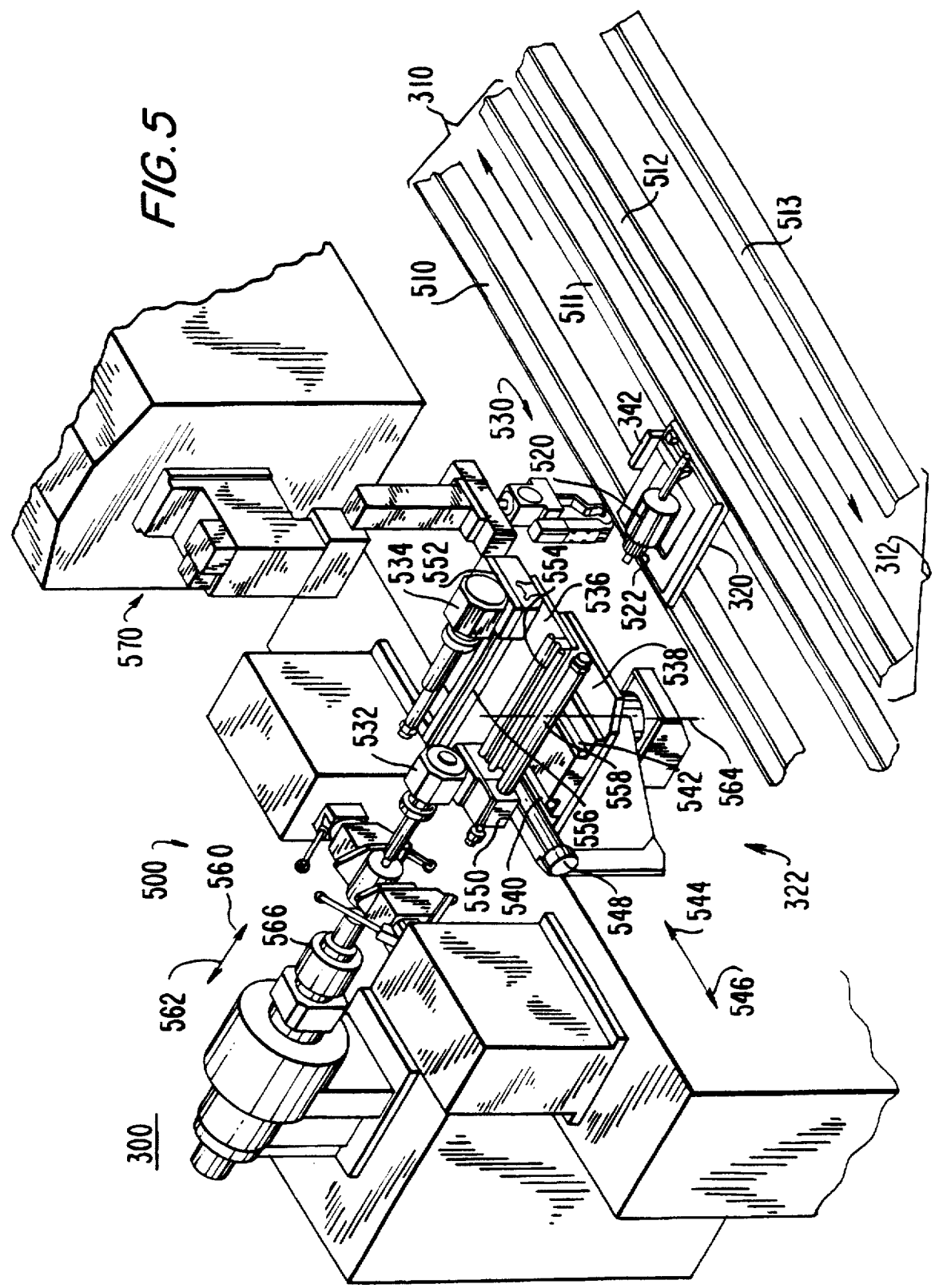

DYNAMO-ELECTRIC MACHINE COMPONENT CONVEYING SYSTEMS AND LOAD/UNLOAD DEVICES

This is a division of application Ser. No. 08/305,685, filed Sep. 13, 1994 now U.S. Pat. No. 5,653,014.

BACKGROUND OF THE INVENTION

The present invention relates to improving conveying systems for transporting dynamo-electric machine components between a series of processing machines of an automatic, parallel processing, production line, and for delivering such components to a selected one of the series of processing machines for processing. More particularly, the present invention relates to conveying systems for transporting dynamo-electric machine components (e.g., electric motor parts) having magnetic cores between a main conveyor and a selected one of a series of processing machines working in parallel along the main conveyor. The present invention further relates to load/unload devices for transferring dynamo-electric machine components between the main conveyor and the selected processing machines. Dynamo-electric machine components are loaded directly from the main conveyor line onto a load/unload device, and from the load/unload device onto the selected processing machine in a time-efficient manner. The load/unload device has two component holders (e.g., collets) movably mounted on a base platform for alternate alignment for loading and unloading of dynamo-electric machine components. The load/unload device moves between the main conveyor and the selected processing machine while the central axis of the load/unload device preferably remains fixed.

Automatic manufacturing lines for processing dynamo-electric machine components having a magnetic core (hereinafter "components") typically transport the components between a variety of machines. (By "magnetic core" it is meant that the core is magnetizable, not that it is necessarily magnetized at all times.) For example, armatures are conveyed to such machines as winding machines and fusing machines. The present invention is specifically related to conveying such components as armatures to any type of machinery or processing apparatus that characteristically is used in parallel with at least one other identical machine on a particular conveyor section. These machines typically have slower production rates than machinery that is not used in parallel production lines (i.e., machinery in manufacturing lines where only one machine of a particular type is present on the line). These machines also usually require the components to be removed from the pallets on which they are conveyed in order to be processed. Once processing has been accomplished, the component is returned to an empty pallet for transport to other downstream machines of the manufacturing line.

One example of a conveying system is shown in FIG. 1. A main conveyor section 100 transports pallets carrying components such as armatures to any one of the machines 102, 104, and 106 of the same type. Additional conveyors 112, 114, and 116 are placed in front of respective machines 102, 104, and 106 for conveying to a selected machine components to be processed. Transfer devices 122, 124, and 126 remove pallets carrying components to be processed from main conveyor section 100 and transfer the pallets to the additional conveyors 112, 114, and 116, respectively.

Once a pallet is on one of additional conveyors 112, 114, 116, the component it is carrying can be transferred to a corresponding machine 102, 104, 106 for processing. The pallet can then receive a processed component from the machine along which the pallet is conveyed. After the pallet receives a processed component, the pallet can move to the downstream transfer device 132, 134, 136 associated with the additional conveyor on which the pallet is conveyed, and be returned to main conveyor section 100. The pallet, now carrying a processed component (such as a wound armature), is subsequently transferred to further conveyor section 110.

The pallets that carry the components for processing are typically provided with coding devices which indicate the processing condition of the component being carried. More precisely, these devices indicate whether a component has or has not been processed by one of machines 102, 104, 106. Writing devices may also be used to change the coding information so that the device indicates that the component has been processed.

Devices for reading the coding devices are placed before transfer devices 122, 124, and 126 to determine whether a pallet needs to be transferred to an associated machine for processing. If the pallet need not be transferred (because the component it is carrying has already been processed), the pallet travels to the end of main conveyor section 100 for transfer to further conveyor section 110. Reading of the coding device occurs each time a pallet reaches one of transfer devices 122, 124, 126. The pallets are stopped against an abutment surface in order to have their coding devices read while the transporter belts continue to move. Before a pallet is transferred to further section 110, another reading of the coding device is performed to determine whether the pallet is carrying an unprocessed component and needs to be returned to the beginning of main conveyor section 100.

Additional conveyor sections 112, 114, and 116 are provided with devices for determining how many pallets are queued up on the selected conveyor waiting to deliver a component to a corresponding machine 102, 104, 106. If the number of pallets on a particular additional conveyor section is at the maximum, then transfer by the transfer device related to that particular section will not transfer a pallet to that section until a place for another pallet is created. Thus, pallets having components which need to be processed travel down main conveyor section 100 until they find a free additional conveyor section 112, 114, 116. If the pallet reaches the end of main conveyor section 100 without having found a free additional conveyor section (e.g., because machines 102, 104, and 106 are all occupied), then transfer device 140 transfers the pallet to return conveyor 142, and transfer device 144 returns the pallet to the beginning of main conveyor section 100. The pallet then once again attempts to find a free additional conveyor section 112, 114, 116, as described above.

A possible disadvantage of this type of conveying system in some situations is the delays that occur while pallets and components are transferred. When pallets are transferred by transfer devices 122, 124, 126, 132, 134, 136 between main conveyor section 100 and additional conveyor sections 112, 114, 116, pallets upstream of the pallet being transferred are halted to allow the transfer to occur. Loading and unloading of components between pallets on additional conveyor sections 112, 114, 116 and machines 102, 104, 106 occurs by stopping the pallet in front of the associated load/unload device 152, 154, 156, removing the component to be processed, and placing on the now empty pallet a processed component so that the pallet can be transferred back to main conveyor section 100 without waiting for completion of processing of the component it had delivered.

Another characteristic of systems of the type shown in FIG. 1 is that the additional conveyor sections tend to require additional floor space and may increase the maintenance requirements of the system. As shown in FIG. 1, five different conveyor sections must continue to run smoothly for the conveying system to be fully operational.

Finally, load/unload devices 152, 154, 156 may be regarded as relatively slow in transferring components between additional conveyor lines 112, 114, 116, and machines 102, 104, 106, respectively.

A second type of conveying system is shown in FIG. 2. A main conveyor 200 transports pallets carrying components to a number of machines, such as winder 202, in a parallel processing system. When a pallet carrying a component to be processed approaches an available machine, the pallet is transferred to a secondary conveyor 210, which is preferably perpendicular to main conveyor 200. From secondary conveyor 210, the component to be processed is transferred to a collet on carriage 220. Carriage 220 is positioned on slide 230, which is cantilevered from support 240. Slide 230 slides in direction 232 to bring carriage 220 adjacent secondary conveyor 210 in a plane spaced above the plane of secondary conveyor 210. As viewed in FIG. 2 the stopping point of slide 230 is below the depicted location of the pallet on secondary conveyor 210. The component on this pallet is then lifted off the pallet. Carriage 220 slides laterally on slide 230 along direction 222 to alternately align collet 226 with the pallet (to receive a component from the conveying system for processing) and to align collet 224 with the pallet (to return a processed component to the conveying system). Slide 230 slides along direction 232 to transport carriage 220 to winder 202 to load a processed component onto collet 224 (then aligned with winder 202). Carriage 220 then slides along direction 222 to deliver a component to be processed, carried by collet 226, to winder 202. Slide 230 then slides back to additional conveyor 210 to repeat the above steps.

Because this conveying system also uses additional conveyor lines 210 to which pallets are transferred, this system may also have the above-described possible disadvantages of time delays during pallet transfer, the necessity of additional floor space, and increased maintenance requirements. The length of travel of slide 230 also tends to be quite long.

A third type of a conveying system, described in Nussbaumer U.S. Pat. No. 4,718,533, does not use additional conveyor sections (such as those shown in FIG. 1). When a pallet needs to be loaded or unloaded at a particular machine, the pallet is lifted off the main conveyor so that pallets that need to reach a downstream portion of the conveyor line can travel beneath the lifting device. This system tends to require complicated pallet-lifting equipment.

In view of the foregoing, it would be desirable to provide a conveying system and method that would quickly and efficiently convey components to be processed through a manufacturing line, and transport the components between the means conveying the components and the machines in the manufacturing line.

It would also be desirable to provide a conveying system and method that would not require conveyor lines in addition to the main conveyor line or complicated pallet lifting equipment that may tend to increase machinery costs and require large areas of manufacturing plant floor space.

It would further be desirable to provide a load/unload device and method that quickly and efficiently transports components between a conveyor line and a processing machine.

SUMMARY OF THE INVENTION

It is therefore an object of this invention to provide a system and associated method for quickly and efficiently conveying components to be processed through a parallel processing production line, and transporting the components between the means conveying the components and the machines in the production line.

It is also an object of this invention to provide a conveying system and method that does not require conveyor lines in addition to the main conveyor line or complicated pallet lifting equipment that tends to increase machinery costs and require large areas of manufacturing plant floor space.

It is a further object of this invention to provide a load/unload device and method that quickly and efficiently transports components between a conveyor line and a processing machine.

These and other objects are accomplished in accordance with the principles of this invention by providing a system having a main conveyor for conveying components (defined above to mean dynamo-electric machine parts having a magnetic core) along a series of machines in a parallel processing system, and a load/unload device adjacent each machine for transferring components between the adjacent machine and the main conveyor. The load/unload device is movable between the main conveyor and the processing machine with which the particular load/unload device is associated. The load/unload device has a base platform for carrying a movable carriage on which at least two component holders such as collets are positioned. The base platform has an alignment area at which a component holder is positioned for transfer of a component. Each time the alignment area is positioned for a transfer, the component holders are sequentially positioned at the alignment area for delivery of a component from one component holder and receipt of another component by another component holder.

The number of pallets present in a particular conveyor section of the conveyor line depends on the upstream supply of the conveyor line and also on the productivity of the machinery being supplied by a related conveyor section. The conveyor has belts that move continuously during manufacturing to move the pallets between machines in the conveyor/manufacturing line. The conveyor sections transport the components between machines such as winding machines, fusing machines, or any type of machinery that characteristically has more than one machine working in parallel on a particular conveyor section.

BRIEF DESCRIPTION OF THE DRAWINGS

The above and other objects and advantages of the invention, its nature, and various advantages will be apparent from the following detailed description of the preferred embodiments, taken in conjunction with the accompanying drawings, in which like reference characters represent like elements throughout, and in which:

FIG. 4a is a graphic representation of the time required to transport components between a prior art conveying system and one of a series of processing machines, compared with FIG. 4b which is a graphic representation of the time required to transport components between the conveying system of the present invention and one of a series of processing machines;

FIG. 5 is an isometric view of an illustrative embodiment of the conveying system and load/unload device of the present invention;

DETAILED DESCRIPTION OF THE PREFERRED EMBODIMENTS

Figure 3:
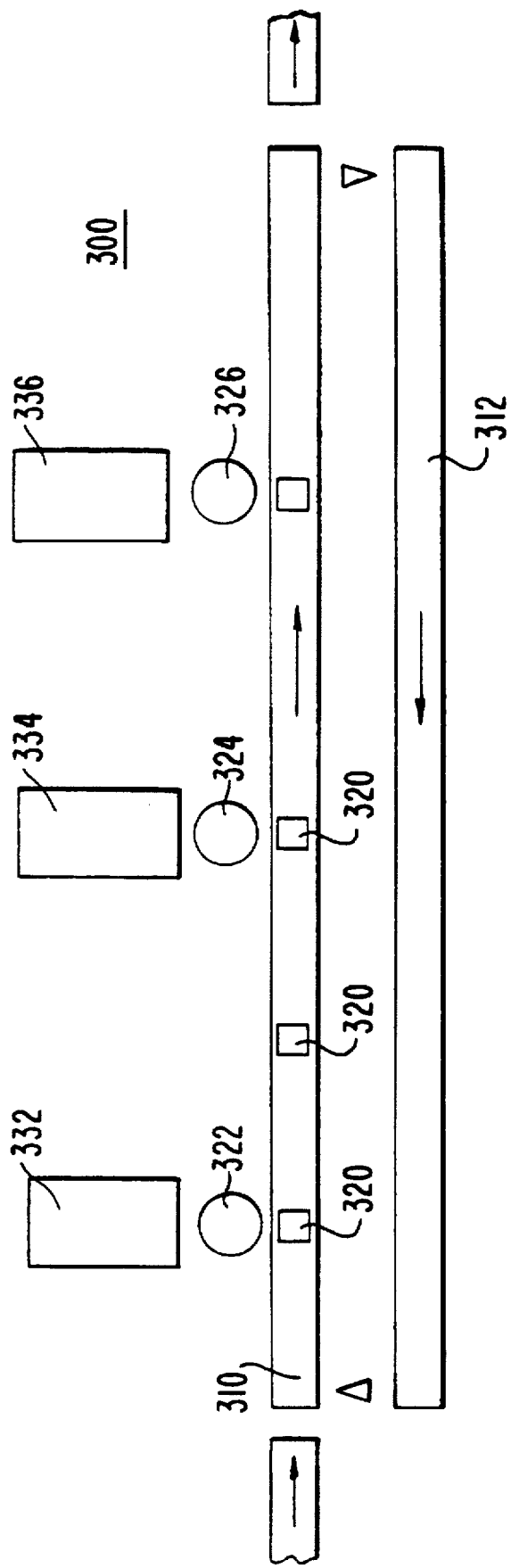
FIG. 3 is a schematic plan view of an illustrative embodiment of the conveying system of the present invention.

A conveying system 300 for a parallel processing system/production line in accordance with the principles of the present invention is shown schematically in FIG. 3. System 300 only has one main conveyor 310 from which components to be processed are removed for processing and to which processed components are returned. Main conveyor 310 extends along all of the processing machines in the series of processing machines of the production line. It will be understood that main conveyor 310 is referred to as a single conveyor, but may be several separate, aligned conveyors forming a continuous conveyor line extending along all of the processing machines in the series. A return conveyor 312 is present to return unprocessed components that could not be processed during their first pass along conveyor 310 (e.g., because all the machines or load/unload devices were occupied when the component passed by) to the beginning of main conveyor 310 to once again convey the components through the system. While on conveyors 310 and 312 each component is supported on a pallet 320. Each conveyor 310, 312 preferably has two parallel conveyor belts, as shown in further detail in FIG. 5, and as described in further detail below. It will be understood that any other means for transporting components (or pallets) between the processing machines in the system may be used.

Conveyor 310 carries the components to load/unload devices 322, 324, and 326, which load and unload components to and from processing machines 332, 334, and 336, respectively. Main conveyor 310 extends between all of processing machines 332, 334, 336. Load/unload devices 322, 324, and 326 can load and unload components in a very short time, as will be described in further detail below. Accordingly, additional conveyors parallel or perpendicular to main conveyor 310, such as are employed in the prior art, are not necessary to transport components to the relatively slow processing machines to be used in the present invention.

When a pallet reaches a load/unload device 322, 324, 326, if the component carried thereon needs to be processed, then the pallet is halted to allow for unloading of the component onto the load/unload device and subsequent loading of the pallet with a processed component. Pallets upstream of the pallet being loaded/unloaded are halted while loading/unloading occurs. Because the time required to load/unload a component is extremely short, the conveying system is capable of operating at approximately the same production rate of a parallel processing system of the prior art having the same number of processing machines 332, 334, 336.

Preferably the component transfer times in the systems of this invention are less than those in prior art systems. But even if the present transfer times are slightly greater than in prior art systems, the overall production rate and/or average efficiency of utilization of the production machines may be the same as or greater than in prior systems. This will now be explained in more detail.

Figure 1:
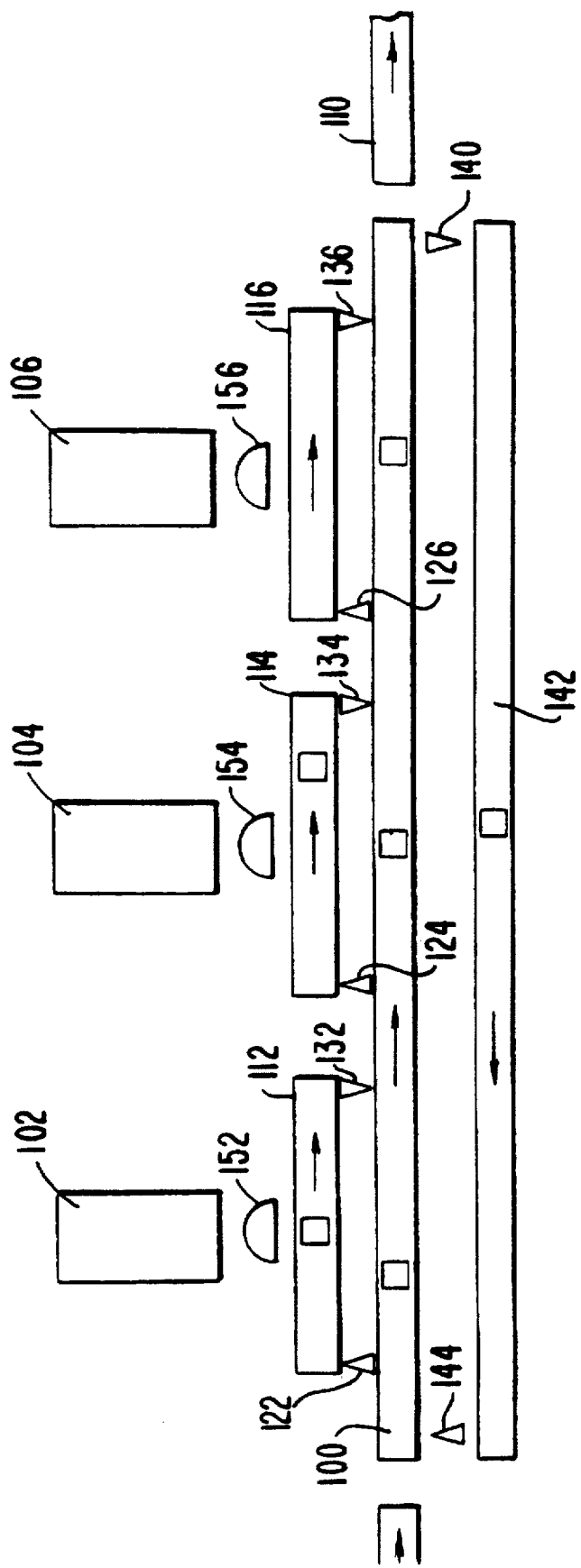
FIG. 1 is a schematic plan view of a prior art system using additional conveyor sections and load/unload devices which transfer components between pallets and processing machines.
Figure 2:
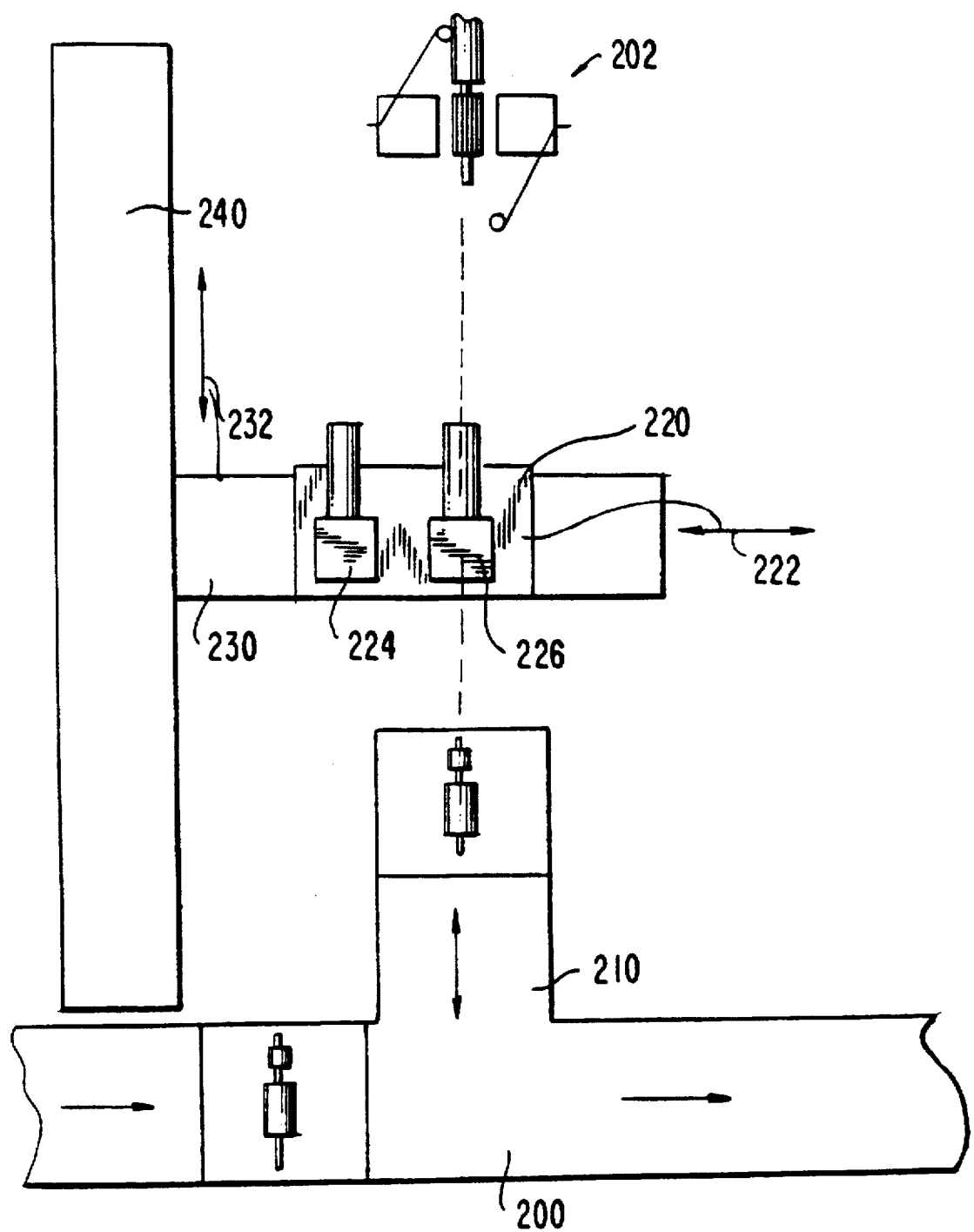
FIG. 2 is a schematic plan view of a prior art system using an additional conveyor section and a slidable carriage for transferring components between pallets on the conveyor section and processing machines.

A comparison of time graphs relating to the operation of the prior art system of FIG. 1 (requiring an additional parallel conveyor section) and the operation of the present system is shown in FIG. 4. In graph (a), time $T_1^*$ is the time required by the prior art system of FIG. 1 for the entire unloading of a component to be processed from the conveyor and subsequent loading of a processed component onto the conveyor. Time $T_1^*$ causes halting of the pallets and therefore stops supply of the pallets to the machines. This time includes time $T_A^*$ for halting a pallet and reading its coding device, time $T_B^*$ for transferring a pallet from the main conveyor section to the additional conveyor section, and time $T_C^*$ for transferring a pallet from the additional conveyor section to the main conveyor section. In contrast, in graph (b), the time $T_1$ is the total time required for the load/unload device of the present invention to remove a component to be processed from a pallet on the main conveyor and to load a processed component on the same pallet—achieving the same effect as all the steps of graph (a) in a practically equal if not shorter time. Time $T_1$ also corresponds to the time during which pallets are halted and accordingly determines the delay for the pallets that have been halted to reach successive machines for processing. The time delay for halting pallets is a basic parameter for determining the production capacity of any of the systems that are described herein. That time delay is also a parameter for determining the efficiency with which the machines placed in the parallel processing production line are used.

A comparison of the production capabilities of the systems of FIGS. 1 and 3 begins by noting that the two systems have the same number of production machines (e.g., winders), which means that they are theoretically capable of producing the same production rates. In practice, the machines of each system will only be used for a fraction of their maximum possible production rate. This fraction depends on the conveying system with which the machine is working and is influenced by the timing of the system to supply pallets to the machines. In the system of FIG. 1, this timing depends on the time to unload and to load the pallets off and on conveyor 100 and the time to read the code of the pallet at points 122, 124, or 126. In the system of FIG. 3 this timing depends on the time that a pallet is required to stop at a machine in order to unload and load components between load/unload device 322, 324, or 326 and the pallet.

The fraction of a machine's maximum production capability that is actually used is often defined as the "efficiency" of use of the machine. A comparison between the systems of FIGS. 1 and 3 should include an examination of this efficiency fraction for the individual machines which are present in the systems. For the system of FIG. 1 this efficiency fraction is very high (e.g., 99%) for the first machine of the system (the one on the extreme left), a little lower (e.g., 98%) for the machine in the middle, and much lower (e.g., 95%) for the machine on the extreme right. For the system of FIG. 3 the efficiency fraction descends more gradually from the first machine (on the left) to the last machine (on the right) (e.g., 99% for the first machine, 98% for the middle machine, and 97% for the last machine). These results show that the system of FIG. 3 is capable of obtaining high production rates from the overall system and a more uniform distribution of efficiency of use among the machines. This last consideration is a positive aspect because it means that all the machines are being used near to their highest capabilities of producing. Finally, the system of FIG. 3 has an important advantage over the system of FIG. 1 because it requires less conveying equipment, occupies less floor space, and can function well even without coding devices on the pallets.

The times $T_1^*$ and $T_1$ shown in the graphs of FIG. 4 coincide with the times described above for reaching the above-mentioned conclusion regarding the comparison between the system of FIG. 1 and the system of FIG. 3. In the FIG. 4 graphs the time $T_1^*$ for the system of FIG. 1 is shown as being longer than the time $T_1$ of the system of FIG. 3. However, the same conclusion regarding comparison between the systems of FIGS. 1 and 3 can be reached even if time $T_1^*$ is somewhat shorter than time $T_1$. The irregularity with which the interruption of pallet supply occurs in the system of FIG. 1 can result in the system of FIG. 3 being more productive and/or having more uniformly distributed production than the system of FIG. 1 even if $T_1^*$ is slightly less than $T_1$.

A conveying system 300 and load/unload device 322 (which is substantially identical to devices 324 and 326) for use in an armature winding production line/parallel processing system in accordance with this invention are shown in greater detail in FIG. 5. (See also FIGS. 6 and 7 which show the load/unload device of FIG. 5 in different positions and operating conditions.) As shown, a pallet 320 is carried by main conveyor 310 to load/unload device 322. Main conveyor 310 preferably has two parallel belts 510 and 511 which continuously move between machines in the system. Likewise, return conveyor 312 preferably has two parallel belts 512 and 513 which continuously move pallets carrying components that need to be processed from the end of main conveyor 310 to the beginning of main conveyor 310. The two belts 510 and 511 that are used in main conveyor 310 preferably are spaced apart a sufficient distance to allow a movable stop 342 to come up between the belts and stop a pallet 320 under gripper 530.

A gripping device 530 (such as the gripping device described in Santandrea et al. U.S. Pat. No. 5,257,689 or Andorlini et al. U.S. Pat. No. 5,253,912) descends and then grips, lifts, and removes armature 520 from the stopped pallet. Gripping device 530 also rotates 180° about its vertical axis as it lifts armature 520. This reverses armature 520 end for end from its position on pallet 320.

Figure 6:
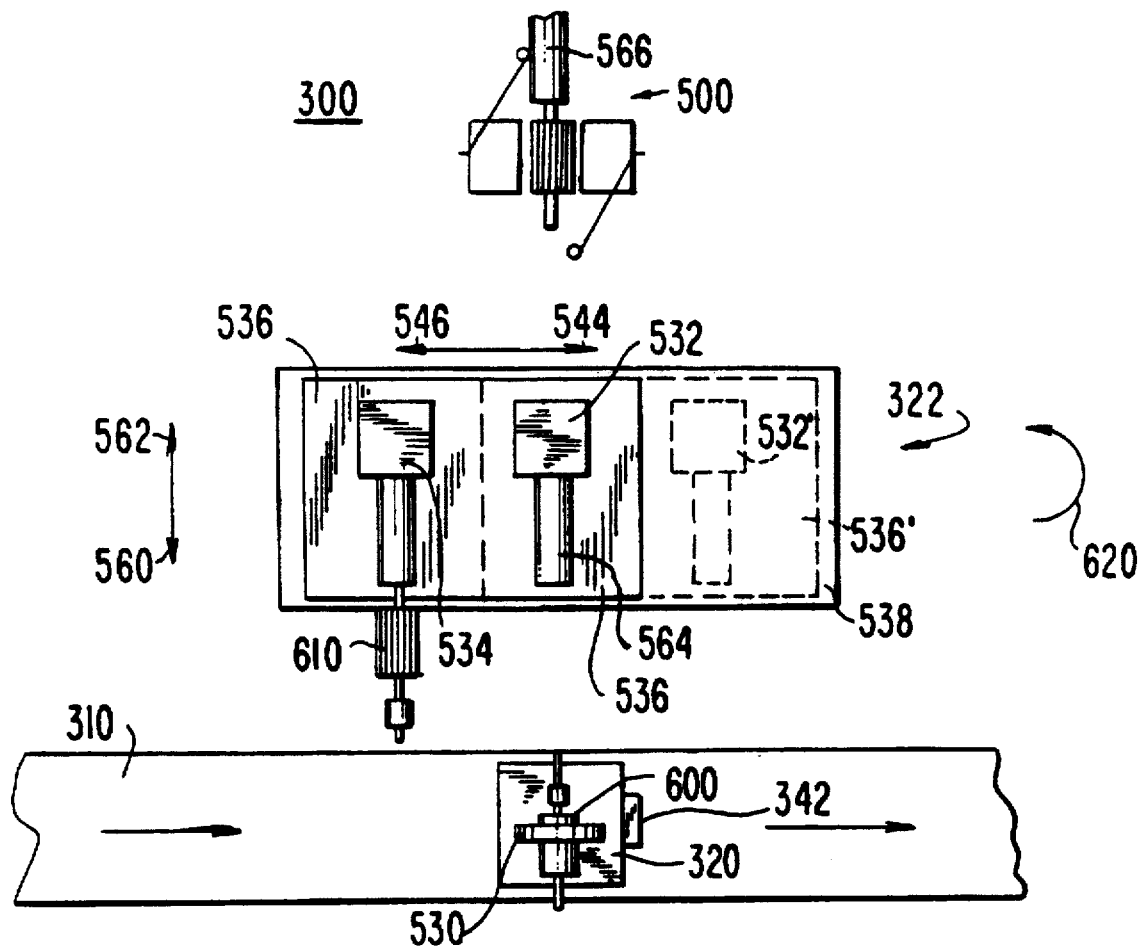
FIG. 6 is a schematic plan view of the conveying system and load/unload device of FIG. 5, showing the load/unload device loading and unloading components onto and from the main conveyor.

When collet 532 of load/unload device 322 is aligned with gripping device 530 at an alignment area associated with load/unload device 322 (see FIG. 6 for this condition of load/unload device 322, although FIG. 6 shows a differently numbered armature 600 prior to the above-mentioned 180° rotation of gripping device 530), collet 532 removes armature 520 from gripping device 530. Collet 534 should already be gripping a wound armature it received from winder 500 (unless the conveyor system has just begun processing components) and waiting alongside collet 532, not aligned with gripping device 530. Collets 532 and 534 may be any desired component holding devices, and preferably in this instance are collets designed and shaped to hold an armature, such as shown in Lombardi U.S. Pat. No. 5,178,428. In the particularly preferred embodiment shown in the drawings collets 532 and 534 grip the shafts of armatures 520 remote from the commutator end 522 of the armatures. This is done so that the commutator end of the armature can be inserted in winding machine 500 (and fusing machine 570 if a fusing machine is included as shown in FIG. 5).

Collets 532 and 534 preferably are positioned on carriage 536, which is slidable on base 538 along tracks 540 and 542 (in directions 544 and 546, parallel to the transverse axis of base 538). Base 538 (and therefore everything mounted on base 538) is rotatable about vertical axis 564. The alignment area of load/unload device 322 is determined with respect to base 538. Sliding of carriage 536 is actuated by pneumatic cylinder 548. It will be appreciated that collets 532 and 534 may be directly slidably mounted on base 538 instead. Once collet 532 receives a component to be processed, in this case an unwound armature, carriage 536 slides in direction 544 to align collet 534, carrying a wound armature, with gripper 530. Thus collet 532 moves away from the alignment area of load/unload device 322 and collet 534 moves into the alignment area. Collet 534 transfers the wound armature to gripper 530, which rotates 180° about its vertical axis and descends to place the armature on the pallet below the gripper. It will be understood that a component may be transferred between pallet 320 and one of collets 532 and 534 without the use of gripping device 530 or by means other than gripping device 530. For example, an armature lifting device could come up below armature 520 through the central aperture in pallet 320 to raise the armature off the pallet. (See, for example, Santandrea et al. U.S. Pat. Nos. 5,060,781 and 5,115,901 for discussions of this type of apparatus and suitable pallets.)

In order to transfer armatures between collets 532 and 534 and gripper 530, each collet slides along its longitudinal axis to approach and withdraw from gripper 530. Collets 532 and 534 are respectively mounted on collet carriages 550 and 552, which respectively slide along slides 554 and 556, parallel to the longitudinal axes of collets 532 and 534. A pneumatic cylinder, such as cylinder 558, actuates translation of each collet carriage along the longitudinal axis of the collet as desired. It will be understood that any other means for translating collets 532 and 534 may be used. Preferably each collet has a rest position at which the rear end of the collet (the end opposite the gripping portion of the collet) is positioned at the end of its respective track and the gripping portion of the collet is positioned substantially completely above carriage 536. Thus, to approach gripper 530 (when base 538 is rotated about axis 564 so that the gripping portion of the collet is facing gripper 530), a collet moves in direction 560. To return to its rest position, the collet moves in direction 562.

Figure 7:
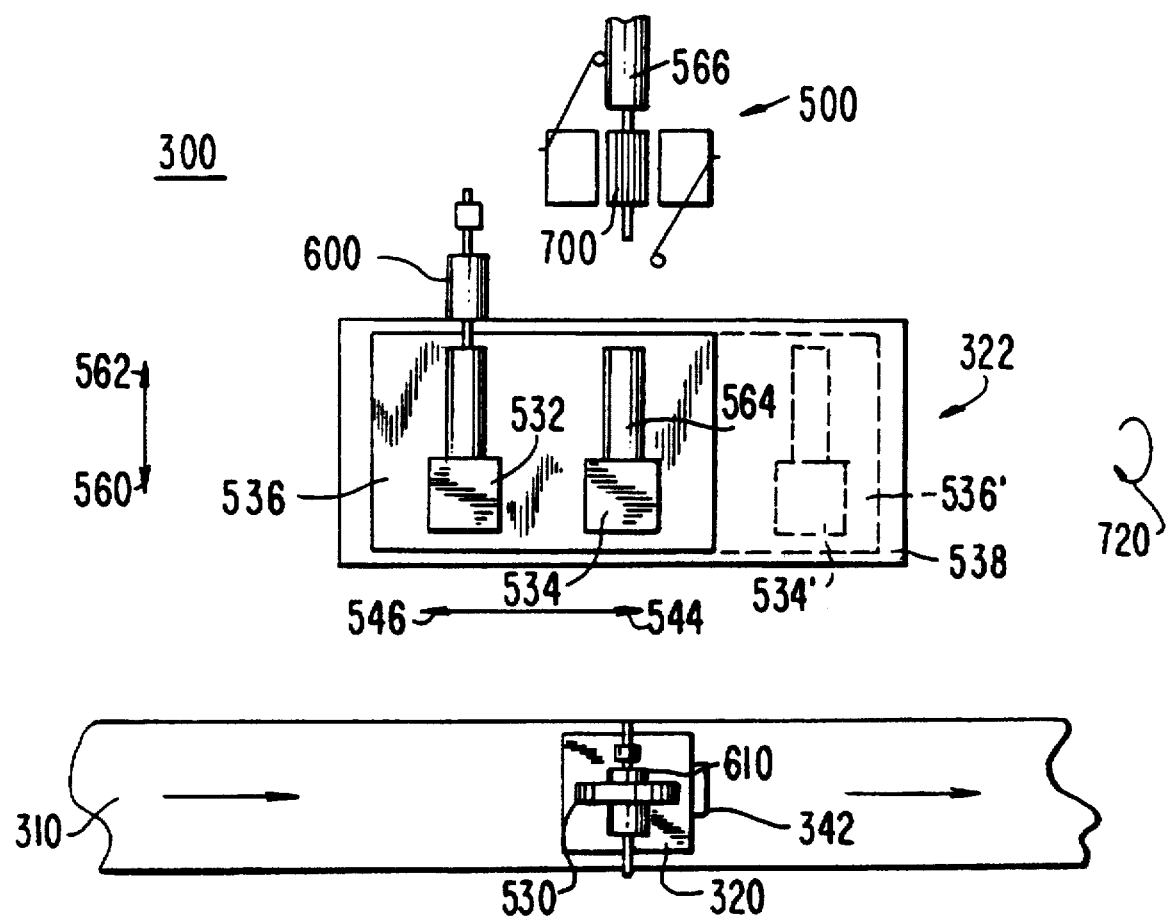
FIG. 7 is a schematic plan view of the conveying system and load/unload device of FIG. 5, showing the load/unload device loading and unloading components onto and from a selected machine along the production line.

Once a wound armature (or other processed component) is removed from collet 534, carriage 552 returns collet 534 to its rest position (collet 532 should already be in its rest position) and base 538 is rotated 180° about the central axis 564 of load/unload device 322 (see also FIG. 7 for this condition of the load/unload device). Central axis 564 remains at a fixed location. Preferably, when rotation occurs, both collets are in their rest positions. A motor, reduction gear, and gear mechanism, or any other desired mechanism, such as intermittors, can be used to rotate base 538. It will be understood that winder 500 need not be directly opposite main conveyor 310, and therefore base 538 may be rotated greater or less than 180° about axis 564. Carriage 536 maintains its position relative to base 538 during rotation. Thus, collet 534, which is now empty, is now aligned with winder 500.

Collet carriage 552 advances collet 534 in direction 562 toward winder 500 to remove a wound armature from winder collet 566, and then returns collet 534, along direction 560, to its rest position. If desired, a gripper such as gripper 530 may be used to transfer the wound armature from winder collet 566 to collet 534. Carriage 536 then translates along direction 544 to align collet 532, carrying an unwound armature (or other unprocessed component), with winder 500. Collet carriage 550 advances collet 532 in direction 562 toward winder 500 to deliver the armature for winding, and then returns collet 532, along direction 560, to its rest position. Once again, if desired, a gripper such as gripper 530 may be used to transfer the unwound armature from collet 532 to winder collet 566. Base 538 then rotates 180° along central axis 564 to have the gripping portions of collets 532 and 534 once again face gripper 530 so that the cycle can be repeated. Alternatively, base 538 can rotate 90° to have the gripping portions of collets 532 and 534 face another processing machine such as fusing machine 570, and a similar exchange of processed components for components to be processed occurs before returning base 538 to its initial position with the alignment area adjacent main conveyor line 310. (Fusing machine 570 may be a conventional device for producing finished mechanical and electrical connections between the leads of the coils wound on the armature by winder 500 and the commutator segments to which those coil leads extend.) Preferably, when rotation of base 538 occurs, both collets are in their rest positions.

Schematic plan views of conveying system 300, showing the steps involved in loading and unloading load/unload device 322, are illustrated in FIGS. 6 and 7. In FIG. 6, collet 532 is shown aligned with an unwound armature 600 (any other component to be processed may be used) carried by pallet 320, i.e., collet 532 is shown at the alignment area of load/unload device 322. Armature 600 is halted on main conveyor 310 awaiting transfer (such as by means of gripper 530) to load/unload device 322. If gripper 530 is used, gripper 530 lifts unwound armature 600 from pallet 320 and rotates it 180° as described above. Collet 532 advances in direction 560 toward gripper 530 to receive unwound armature 600, and then retreats in direction 562 to its rest position.

Carriage 536 then translates in direction 544 along the width of base 538 to position 536' to align collet 534 with gripper 530. Collet 534 is thereby placed at the same location at which collet 532 is shown in FIG. 6, i.e., the alignment area, and collet 532 is thereby placed at collet position 532'. Collet 534, carrying wound armature 610, advances in direction 560 to unload wound armature 610 to gripper 530, and then retreats in direction 562 to its rest position. Gripper 530 rotates 180° as described above and lowers wound armature 610 onto the waiting pallet which has just been unloaded and is stationary on main conveyor 310. These steps are skipped, however, if a wound armature has not yet been loaded onto collet 534.

Load/unload device 322 is then ready to unload/load components to and from winder 500. Base 538 therefore rotates in direction 620 around its central axis 564 to present the gripping portions of collets 532 and 534 to winder 500, as shown in FIG. 7.

After rotation of base 538, empty collet 534 is initially aligned with winder collet 566 to receive wound armature 700, i.e., collet 534 is at the alignment area, as shown in FIG. 7. Collet 534 advances in direction 562 toward winder 500, receives wound armature 700, and retreats in direction 560 to its rest position on carriage 536. This step is skipped, however, if winder 500 has not yet begun winding armatures. Carriage 536 then translates in direction 544 to position 536' to align collet 532, carrying unwound armature 600 (see FIG. 6), with winder collet 566. Collet 532 is thereby placed at the same location at which collet 534 is shown in FIG. 7, i.e., at the alignment area, leaving collet 534 at collet position 534'. Collet 532 advances in direction 562 toward winder 500, unloads unwound armature 600 for winding by winder 500, and retreats in direction 560 to its rest position on carriage 536. Base 538 is then ready to rotate in direction 720 around its central axis 564 to return the system to the condition shown in FIG. 6.

Pallet 320, from which an unwound armature was removed and on which a wound armature has been loaded, is allowed to move along main conveyor 310 as soon as the pallet receives the wound armature (i.e., before the rotation 620 described above in connection with FIG. 6). Any pallets that were queued up behind the pallet that was just unloaded and loaded can also continue to move along conveyor 310.

The pallets on main conveyor 310 are halted by movable stop 342 only for the time required by load/unload device 322 and gripper 530 to accomplish the above-described operations of removing a component to be processed from the pallet and delivering to the same pallet a processed component. Halting of the pallet occurs only if the load/unload device is ready to deliver a processed component (or if the processing machine is just starting up and needs an unprocessed component to work on). The pallet immediately behind the stopped pallet will be halted when it comes into abutment with the pallet stationary under gripper 530. Other pallets will be stopped in succession by abutting against each other.

A computer or any other equivalent device can be used to monitor the status of the components in machine 332 and associated load/unload device 322 to determine whether a pallet should stop at load/unload device 322. If the load/unload device contains no processed component and the processing machine is not in need of an unprocessed component from conveyor 310, the pallet passes load/unload device 322 without stopping so that the pallet can reach the next load/unload device 324 and processing machine 334. The pallet continues until a processing machine has a load/unload device containing a processed component that it needs to release (or until a processing machine needs an unprocessed component from conveyor 310 in order to start up). At the end of main conveyor 310, any pallets carrying components that have not yet been processed can be returned by return conveyor 312 to the beginning of main conveyor 310 to attempt, another time, to find a free machine for processing.

Conveying system 300, operating as described above, typically requires a pallet to remain stationary for a shorter time than the prior art systems. Additionally, load/unload devices 322, 324, 326 are configured and perform in a way that also requires less time than the load/unload devices of the prior art. It should also be noted that the time required to load and unload a processing machine is extremely short and that, as a consequence, the processing machines remain stationary without producing for an extremely short time. A pallet only has to remain stationary long enough for an unprocessed component to be removed from the pallet and for a processed component (which was previously retrieved from the processing machine and which is therefore waiting in the load/unload device) to be loaded on the pallet. Similarly, a processing machine only has to be stopped long enough for a processed component to be removed from the processing machine and for an unprocessed component (which was previously retrieved from a pallet and which is therefore waiting in the load/unload device) to be loaded in the processing machine.

Preferably the systems of this invention are controlled so that completion of a processing operation by a processing machine is anticipated by having the associated load/unload device perform an unload and load operation on a pallet and rotate about axis 564 before the processing machine completes its operation and therefore requires the next unprocessed component. The pallet just unloaded-and loaded can immediately resume its travel along conveyor 310. When the processing machine completes its operation, the load/unload device is immediately ready to unload that machine and to load it with the unprocessed component previously unloaded from a pallet. The processing machine can then resume processing, while the load/unload device rotates back toward conveyor 310 to await a suitable opportunity to exchange the just-received processed component for an unprocessed component on another pallet. The pallets do not have to wait for any processing machine operations or even for all load/unload device operations. Nor does a processing machine have to wait for any pallet operations or even for all load/unload device operations. All significant waiting is done by the load/unload device itself, which alternately holds an unprocessed component waiting for a suitable time to transfer that component to a processing machine or holds a processed component waiting for a suitable time to transfer that component to a pallet. These features make it possible for the systems of this invention to achieve production rates equal or comparable to those of FIG. 1 type systems having the same number of processing machines without the need for the more elaborate conveyor systems employed in FIG. 1 type systems.

System control of a production line operating in accordance with the principles of the present invention functions smoothly, efficiently, and properly without requiring coding devices that need to be coded and read. This is possible because, contrary to the prior art systems (such as the system of FIG. 1), there is no casual departure or return of pallets from and to the conveyor of the present invention. Once pallets start down conveyor 310 in a predetermined order, they remain in that order at least to the end of conveyor section 310. Thus, it is easier to identify pallets and to know whether or not the pallet carries a component that needs to be processed. For example, a simple counting means can be used to count the advancement of the conveyor and therefore of each pallet.

As mentioned above in connection with FIG. 5, another type of processing machine such as fuser 570 can be added to the apparatus served by a load/unload device of this invention. If this is done, the load/unload device preferably exchanges components with a pallet while processing machines 500 and 570 are both operating, respectively, on two other components. The load/unload device rotates toward processing machine 500 and waits for that machine to complete its component processing operations. The load/unload device then exchanges components with processing machine 500 and rotates toward processing machine 570. Processing machine 500 can immediately resume processing operations. The load/unload device waits for processing machine 570 to finish its processing operations and then exchanges components with that machine. Processing machine 570 can then immediately resume its processing operations, while the load/unload device rotates toward conveyor 310 to await an opportunity to exchange components with another pallet. In this way a load/unload device of this invention can serve two or more different processing machines performing sequential operations on a component.

It will be understood that the foregoing is merely illustrative of the principles of the invention, and that various modifications can be made by those skilled in the art without departing from the scope and spirit of the invention. For example, any desired components other than armatures can be processed according to the method of the present invention. Additionally, equipment equivalent to the equipment shown can be used to accomplish the method of the present invention. The described embodiments are presented for the purpose of illustration rather than limitation, and the present invention is limited only be the claims which follow.

What is claimed is:

1. Apparatus for conveying dynamo-electric machine components having a magnetic core from a winding machine which winds coils of wire having coil leads on said core to a fusing machine which forms permanent mechanical and electrical connections between said coil leads and said components comprising:

first and second component holders;

first means for successively positioning said component holders for exchanging components with said winding machine and for exchanging components with said fusing machine; and second means, operable when said first means positions said component holders for exchanging components with said winding machine, for successively positioning each of said component holders relative to said winding machine so that said first component holder can receive a first one of the components from said winding machine and so that said second component holder can thereafter release a second one of the components to said winding machine, said second means being further operable, when said first means positions said component holders for exchanging components with said fusing machine, for successively positioning each of said component holders relative to said fusing machine so that said second component holder can receive a third one of the components from said fusing machine and so that said first component holder can thereafter release the first one of the components to said fusing machine.

2. The apparatus defined in claim 1 wherein said first, second, and third components are dynamo-electric machine armatures.

3. The apparatus defined in claim 2 wherein said dynamo-electric machine armatures are electric motor armatures.

4. The apparatus defined in claim 1 wherein said winding machine and said fusing machine are disposed adjacent to one another in a predetermined plane, and wherein said first means comprises means for rotating said first and second component holders, as a unit, about an axis which is substantially perpendicular to said plane.

5. The apparatus defined in claim 4 wherein said second means comprises means for shifting said first and second component holders relative to said axis.

6. The apparatus defined in claim 5 wherein said means for shifting shifts said first and second component holders in a plane which is transverse to said axis.

7. The apparatus defined in claim 1 further comprising:

third and fourth means for respectively reciprocating said first and second component holders alternately toward and away from the winding machine or fusing machine with which said first means has positioned said component holders for exchanging components.

* * * * *